Oct. 7, 1969    G. SIMMON    3,470,651
SUPPORTING DEVICE FOR SUMMER FLOWERS
Filed March 17, 1967    2 Sheets-Sheet 1

Inventor:
GERHARD SIMMON
BY
DEZSOE STEINHERZ

Oct. 7, 1969  G. SIMMON  3,470,651
SUPPORTING DEVICE FOR SUMMER FLOWERS
Filed March 17, 1967  2 Sheets-Sheet 2

Inventor:
GERHARD SIMMON
BY
DEZSOE STEINHERZ

United States Patent Office 3,470,651
Patented Oct. 7, 1969

3,470,651
SUPPORTING DEVICE FOR SUMMER FLOWERS
Gerhard Simmon, 18 Waitzstr.,
2 Hamburg 52, Germany
Filed Mar. 17, 1967, Ser. No. 624,035
Claims priority, application Germany, Mar. 25, 1966,
S 102,769
Int. Cl. A01g 5/00; A47g 7/02
U.S. Cl. 47—45   4 Claims

ABSTRACT OF THE DISCLOSURE

A holding device for summer flowers has a funnel-shaped holding screen which is adjustable in height on a rod and which is divided by struts into a plurality of cells. The cells receive the plant stems and the screen is arranged with its concave side facing downward. The struts which form the cells bear pin-shaped projections which extend into the plane of the cells. The screen is surrounded by a rigid marginal ring. A hub for the holding rod having a fastening device, is provided in the middle of the screen. The fastening device consists of tongues having thickened ends uniformly distributed over the circumference of the hub.

---

The present invention relates to a supporting device for summer flowers having a funnel-shaped supporting screen which is adjustable in height on a rod and is divided by struts into a plurality of cells which receive the plant stems.

It has been customary up to now to bind flowers which grow to a large height or which are weak in strength to holding pieces to protect them against damage by the wind. Holding rings of adjustable width supported in vertically adjustable manner on a rod are also frequently used. These devices have the disadvantage that they require a minimum height on the part of the plants to be supported. The plant cannot be bound to them as long as it is low. Furthermore, the ring which surrounds an entire bush cannot by itself prevent some of the stems within the ring from being forced to one side by the wind; the loose structure of the plant is lost and growth, health and flowering suffer thereby.

One supporting device is known which consists of a funnel-shaped holding screen which is vertically adjustable on a rod and divided by struts into a plurality of cells which receive the plant stems. The holding of the individual stems in a plurality of cells is in itself very advantageous since in this way the loose structure of the plant is substantially retained; however, this holding device has not been able to gain popularity in spite of this. It fails in practical use in particular because the funnel-shaped arrangement with the pointed end downward, together with a special type of support, permits use only for those plants which have already attained a certain height. The shoots growing at the edge of a shrub are only provided with support when they have grown higher than the relatively high edge of the screen. The stems must then in practice be forced by hand into the openings of the screen. On the other hand, the central shoots of the bush obtain the greatest height as we know from experience and, therefore, should also be supported at the highest place so that the known holding device is frequently scarcely sufficient any longer for them although the outer shoots have scarcely reached the outer cells of the screen. Furthermore, the known holding device has the disadvantage that shorter shoots which extend through a cell of the holding device only over a short distance are easily forced out by the wind and then do not find any further support.

The object of the present invention is to create a holding device for summer flowers which assures the plant a good support from the very start and which supports the inner shoots of the plant in just as dependable a manner as the outer shoots, which holds the stems dependably together in a loose grouping even in case of a strong wind, which affords a new dependable support even to those stems which have been torn by the wind out of the cell in which they were originally contained and which can adapt itself to the natural growth of the plant. This objective is achieved by placing the screen with its concave side facing downward.

This arrangement makes it possible for the plants to be grasped already at an early date by the bottom edge of the holding screen. The screen can from the very start be placed over the plant as soon as it starts to send out sprouts. The individual shoots then grow through the opening of the screen so that they do not have to be first introduced therein with all the trouble this involves. The screen is moved up step-by-step as the plant grows. Shoots which under the action of the wind are forced out of central and thus higher openings of the screen are automatically caught in the lower lateral openings so that the supporting thereof is assured in all cases. Finally, the downwardly concave shape of the screen better matches the growth of the plant. Medium and long shoots are imparted support at a higher point than the lower outer shoots. It is, of course, immaterial in this connection whether the screen is of precisely conical funnel shape or has a spherically curved shape.

For a uniform cell size and good utilization of the base, a hexagonal shape of the cell openings is advantageous. In order to improve the holding of the stems within certain cells, the struts which form the cells can bear pin-linke projections which extend into the plane of the cells.

The screen is advisedly bounded by a rigid marginal ring, and the latter may in accordance with the invention be provided with downward extending pins or barbs. These pins or barbs hold the screen fast, by penetrating into the ground, when it is placed on the plants in the stage in which they are shooting out of the ground.

The attaching of the screen to a holding rod is effected advantageously by means of a hub which is located in the center of the screen and is provided with a fastening device. This simple arrangement makes it possible, in contradistinction to the known device described above, to hold the screen fast at any desired height of the holding rod and, therefore, also directly above the ground.

The fastening device consists, in accordance with another feature of the invention, of a plurality of tongues with thickened ends which are uniformly distributed around the periphery of the hub and are surrounded by a conical sleeve, so that by axial displacement of the sleeve they can be pressed against the rod which is passed through the hub. In order to fasten the sleeve in the clamped position, the sleeve and the tubularly extended hub are provided with rows of interacting resilient detent teeth.

The invention will be described in further detail below with reference to the drawing in which one advantageous embodiment has been shown by way of example. In the drawing.

Figure 1:
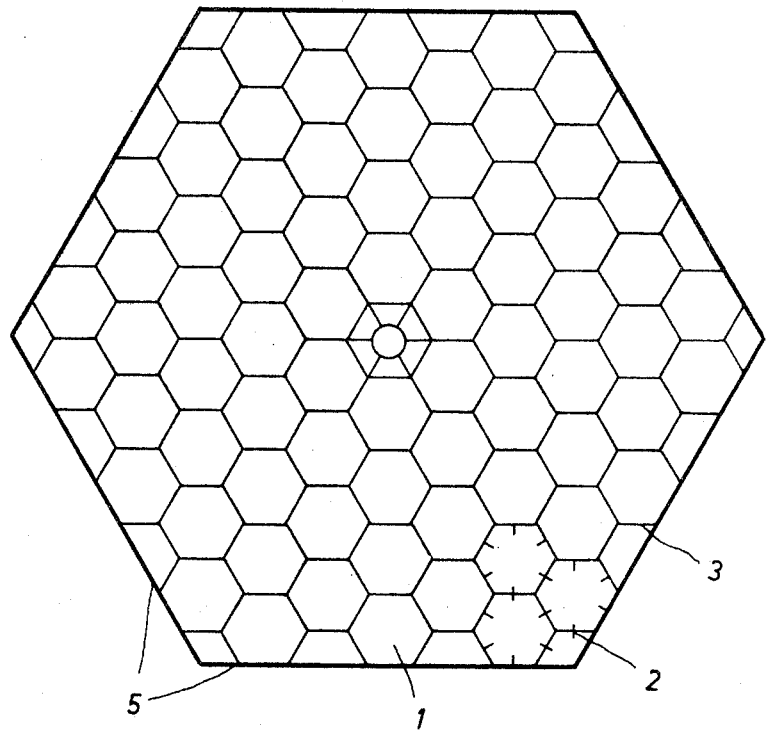
FIGURE 1 is a top view.
Figure 2:
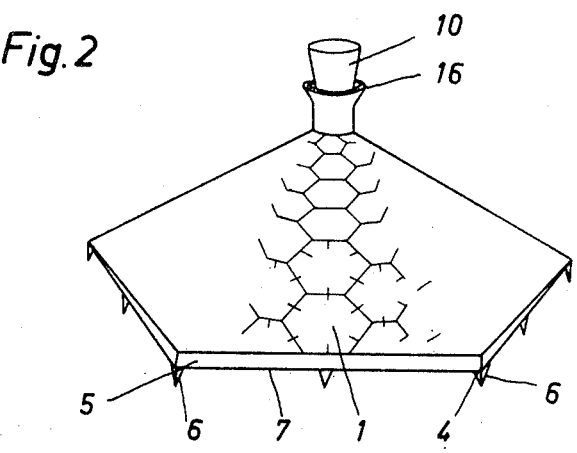
FIGURE 2 is a side view of the screen in accordance with the invention.
Figure 5:
FIGURE 5 is a view showing the end of a strut to indicate the shape of the cross-section of the struts.
Figure 4:
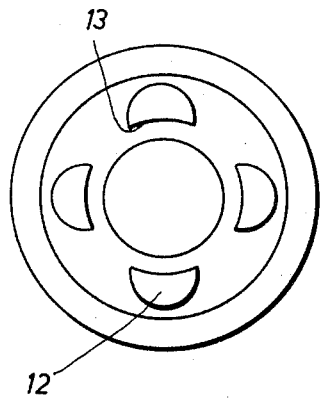
Figure 6:
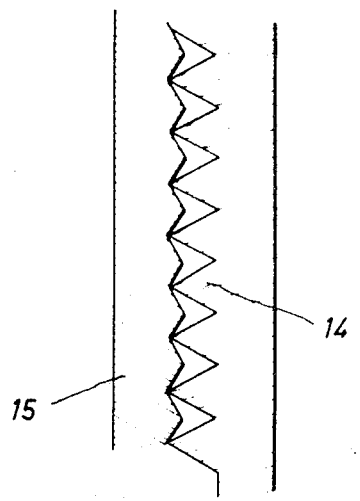

The holding screen consists of a lattice work through which the plant grows, and whereby the stems are supported simultaneously on all sides. The hexagonal shape 1 is particularly advantageous here since, as the largest possible polygon which can be assembled together without gaps, it affords the best static strength with the lowest weight. A hexagonal shape is also advisable for the edge contour 5 since in this way, on the one hand, certain cells of the edge are only divided in half thus retaining a size suitable for growth through them, while, on the other hand, in the case of groups of bushes which are located close to each other, a plurality of holding devices can be arranged without gap alongside of each other. As shown in FIG. 1, the marginal member 5 extends along the outer side of alternate cells 1. Furthermore, the struts can also be provided with pin-like projections 2 in order in this way at the same time to limit the possibility of lateral movement of the individual stems. The screen can be produced in various diameters. The diameter is advisedly selected in each case somewhat greater than the diameter of the plant at the surface of the earth. In this way, the natural loosely bundled growth can be best maintained in the case of higher plants. The thickness of the struts 3 depends not only on the requirement as to static strength, but also on the elasticity of the stem of the plant; it should not be so slight that a stem which is pressed agains it will be bent at the point of contact. The side surfaces 4 of the struts are accordingly slightly rounded and produced without sharp edges (as shown in the cross-section of FIGURE 5).

The umbrella-like upward inclination of the holding screen has the advantage that when the screen is placed at a higher position the plant shoots which slide out of the central cells can find support in the lower cells located towards the outer edge. The honeycomb lattice is limited towards the outside by the marginal ring 5 which can be provided with individual short downward protruding barbs 6. The purpose of these barbs is to press the screen into the earth when it is to be placed at a very early date over the plants and the holding rod is to be put in place only later; in this way the screen will be held better and cannot be blown away by the wind. Regardless of this, it is advantageous to provide at a slight distance below the edge rib of the honeycomb lattice a second ring 7 of the same periphery, the purpose of which is to provide lateral support at an early period to low lateral shoots of the plant so that they can grow upward through the cells.

Figure 3:
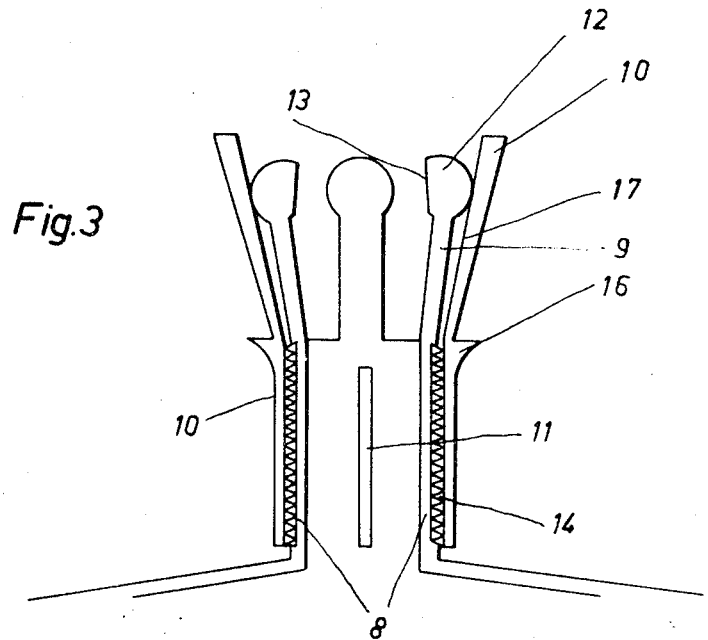
FIGURES 3, 4 and 6 show the fastening device in longitudinal section, in top view and in detail, in part on a larger scale.

The fastening device (FIGURE 3) consists of the hub-like guide tube 8 which is firmly connected at its center to the honeycomb lattice and has spherical tongues 9 and of a conical sleeve 10 placed over same. The elastic spherical tongues represent an extension of the tube 8 which is provided with multiple slots at 11; these tongues terminate in a semi-spherical head 12 the side 13 of which facing the central axis is flattened and rounded off to match the curvature of the rod and is provided with a suitably roughened surface in order to increase the frictional resistance. The number of spherical tongues is dependent on the one hand on the diameter of the rods for which the specific holding device is to be used and, on the other hand, on the diameter of the individual spheres; there will preferably be 3 to 6 spherical heads which, pressed together in the center without holding rod, are to be pushed through the conical sleeve.

The guide tube is surrounded by a rim of parallely extending annular teeth 14 up to the point where the spherical tongues start. The inner diameter of the conical sleeve is adapted in its tubular section to the outer diameter of the guide tube and in its lowermost part has bead-shaped rings 15 also extending parallely which correspond to the ring teeth of the guide tube and engage in them. The sleeve tube thus surrounds the guide tube in the manner of a cap nut, the spherical heads present at the end of the elastic spherical tongues lying against the inside of the conical part. When a rod is to be clamped fast, the conical sleeve is pulled upward by grasping the gripping bulb 16 and at the same time holding the holding screen fast, whereby the beads slide over the annular teeth of the guide tube which is also slightly elastic and slightly resilient as a result of the slots and at the same time the spherical heads, as a result of the taper 17 of the sleeve, are pushed towards the central axis and pressed firmly against the corresponding rod. As soon as the sleeve cannot be pulled up any higher, the clamping process is at an end. Unintentional loosening is not possible since the weight of the conical sleeve itself is not sufficient to overcome the clamping resistance of the engaged annular teeth. The clamping device can be loosened again only by hand by pressing the conical sleeve downward or pushing the screen with guide tube upward.

What is claimed is:

1. A supporting device for the stems of plants and flowers, comprising a substantially vertically disposed rod, holding means vertically slideable on said rod and securable thereto at a selected level, and a network of interconnected struts extending generally downwardly from said holding means at a predetermined angle and forming a generally funnel-shaped screen having apertured cells for receiving said stems therethrough, said rod passing substantially centrally through said funnel-shaped screen; the concave side of said funnel-shaped screen facing downwardly in accordance with the direction of said generally downwardly extending network of interconnected struts.

2. A supporting device for the stems of plants and flowers, comprising a network of interconnected struts forming a funnel-shaped screen having apertured cells of hexagonal shape for receiving said stems therethrough, a rigid marginal member of hexagonal shape surrounding said screen and secured to the lower end of the latter so as to reinforce said screen, said marginal member extending along the outer sides of alternate hexagonal cells, a substantially vertically disposed rod extending generally through the center of said screen, and holding means connecting said rod and said screen at the upper end of the later, said holding means being vertically slideable on said rod and securable thereto for positioning said screen on said rod at a selected level with the concave side of said funnel-shaped screen facing downward.

3. A supporting device for the stems of plants and flowers, comprising a hub, a network of interconnected struts extending from said hub downwardly and forming a funnel-shaped screen having apertured cells to accommodate said stems therethrough, a substantially vertically disposed rod passing generally centrally through said screen and receiving said hub slideably thereon for vertical adjustment, a plurality of tongues extending from said hub and having thickened ends, said tongues being uniformly distributed over the circumference of said hub and around said rod, and a conical sleeve surrounding said tongues and being slideable thereon in a manner such that upon axial displacement of said sleeve in the direction towards said thickened ends said tongues will be pressed against said rod, whereby said hub and funnel-shaped screen may be fastened to said rod at a selected level with the concave side of said funnel-shaped screen facing downward.

4. A device as defined in claim 3, including a tubular portion on said hub, a plurality of rows of external resilient detent teeth on said tubular hub portion, and corresponding rows of internal resilient detent teeth in said sleeve, said external and internal detent teeth being arranged to engage each other for fastening said sleeve on said hub.

References Cited

UNITED STATES PATENTS 1,942,750   1/1934   Eue _____ 47—47

FOREIGN PATENTS 16,300   5/1914   Great Britain.
722,648   1/1932   France.
48,413   3/1910   Hungary.
61,377   10/1913   Hungary.

ROBERT E. BAGWILL, Primary Examiner